United States Patent
Buhler et al.

(10) Patent No.: US 10,436,038 B2
(45) Date of Patent: Oct. 8, 2019

(54) TURBINE ENGINE WITH AN AIRFOIL HAVING A TIP SHELF OUTLET

(71) Applicant: General Electric Company, Schenectady, NY (US)

(72) Inventors: Jared Peter Buhler, Tewksbury, MA (US); Ronald Scott Bunker, West Chester, OH (US); Victor Hugo Silva Correia, Milton Mills, NH (US); Brian Kenneth Corsetti, Lynn, MA (US)

(73) Assignee: General Electric Company, Schenectady, NY (US)

( * ) Notice: Subject to any disclaimer, the term of this patent is extended or adjusted under 35 U.S.C. 154(b) by 532 days.

(21) Appl. No.: 15/162,687

(22) Filed: May 24, 2016

(65) Prior Publication Data
US 2017/0159451 A1   Jun. 8, 2017

Related U.S. Application Data

(63) Continuation-in-part of application No. 14/960,991, filed on Dec. 7, 2015.

(51) Int. Cl.
*F01D 5/18*   (2006.01)
*F01D 5/20*   (2006.01)

(52) U.S. Cl.
CPC ............ *F01D 5/186* (2013.01); *F01D 5/20* (2013.01); *F05D 2220/32* (2013.01); *F05D 2240/307* (2013.01); *F05D 2260/202* (2013.01)

(58) Field of Classification Search
CPC . F01D 5/18; F01D 5/183; F01D 5/186; F01D 5/187; F01D 5/20; F05D 2260/202; F05D 2240/307
See application file for complete search history.

(56) References Cited

U.S. PATENT DOCUMENTS

| | | | |
|---|---|---|---|
| 4,606,701 A | 8/1986 | McClay et al. | |
| 4,893,987 A | 1/1990 | Lee et al. | |
| 5,261,789 A * | 11/1993 | Butts | F01D 5/186 |
| | | | 415/115 |

(Continued)

FOREIGN PATENT DOCUMENTS

| | | |
|---|---|---|
| EP | 1 422 383 A2 | 5/2004 |
| EP | 1 736 636 A1 | 12/2006 |

(Continued)

OTHER PUBLICATIONS

Bogard, D.G., and K.A. Thole, "Gas Turbine Film Cooling," Journal of Propulsion and Power, Mar.-Apr. 2006, pp. 249-270, vol. 22, No. 2. (Year: 2006).*

(Continued)

*Primary Examiner* — Richard A Edgar
*Assistant Examiner* — Topaz L. Elliott
(74) *Attorney, Agent, or Firm* — McGarry Bair PC

(57) ABSTRACT

An airfoil for a gas turbine engine includes a pressure side and a suction side, with a root and a tip wall. The pressure side and suction side extend beyond the tip wall to define a tip channel, defining a plurality of internal and external corners. A tip shelf can be defined in the pressure or suction sidewalls. A film hole can extend to the tip shelf, such that the film hole can be shaped to direct a flow of cooling fluid to the film hole to improve film cooling at the tip shelf.

19 Claims, 13 Drawing Sheets

(56) References Cited

U.S. PATENT DOCUMENTS

| | | | |
|---|---|---|---|
| 6,224,336 B1* | 5/2001 | Kercher | F01D 5/186 415/115 |
| 6,494,678 B1 | 12/2002 | Bunker | |
| 6,790,005 B2* | 9/2004 | Lee | F01D 5/187 416/97 R |
| 6,991,430 B2 | 1/2006 | Stec et al. | |
| 7,118,337 B2 | 10/2006 | Liang | |
| 7,281,894 B2* | 10/2007 | Lee | F01D 5/20 415/173.1 |
| 7,510,376 B2 | 3/2009 | Lee et al. | |
| 7,597,539 B1 | 10/2009 | Liang | |
| 7,645,123 B1 | 1/2010 | Liang | |
| 7,857,587 B2* | 12/2010 | Correia | F01D 5/187 416/228 |
| 8,061,987 B1 | 11/2011 | Liang | |
| 8,066,485 B1 | 11/2011 | Liang | |
| 8,075,268 B1 | 12/2011 | Liang | |
| 8,103,217 B2 | 1/2012 | Kwon et al. | |
| 8,113,779 B1 | 2/2012 | Liang | |
| 8,684,691 B2* | 4/2014 | Lee | F01D 5/20 416/224 |
| 8,961,136 B1 | 2/2015 | Liang | |
| 9,103,217 B2* | 8/2015 | Giglio | F01D 5/186 |
| 9,605,545 B2* | 3/2017 | Grohens | F01D 5/141 |
| 2003/0021684 A1 | 1/2003 | Downs et al. | |
| 2010/0135813 A1 | 6/2010 | Marini et al. | |
| 2014/0186190 A1* | 7/2014 | Zelesky | F01D 5/187 416/97 R |
| 2014/0271226 A1* | 9/2014 | Giglio | F01D 5/186 416/97 R |
| 2014/0322028 A1* | 10/2014 | Grohens | F01D 5/141 416/97 R |
| 2015/0104326 A1 | 4/2015 | Waldman et al. | |
| 2015/0118063 A1 | 4/2015 | Lewis et al. | |
| 2015/0292334 A1 | 10/2015 | Mongillo, Jr. et al. | |
| 2016/0102561 A1* | 4/2016 | Spangler | F01D 5/20 416/95 |
| 2017/0159450 A1 | 6/2017 | Buhler et al. | |

FOREIGN PATENT DOCUMENTS

| | | |
|---|---|---|
| EP | 1 762 702 A2 | 3/2007 |
| EP | 1 793 087 A1 | 6/2007 |
| EP | 2 728 117 A1 | 5/2014 |
| EP | 3 009 600 A1 | 4/2016 |
| EP | 3 081 753 A1 | 10/2016 |
| EP | 3 118 414 A1 | 1/2017 |
| EP | 3 150 803 A1 | 4/2017 |
| EP | 3 179 035 A1 | 6/2017 |
| EP | 3 199 763 A1 | 8/2017 |
| EP | 3 216 983 A1 | 9/2017 |
| WO | 2013/072610 A1 | 5/2013 |
| WO | 2017/153219 A1 | 9/2017 |

OTHER PUBLICATIONS

International Search Report and Written Opinion issued in connection with corresponding PCT Application No. PCT/US2017/025707 dated Dec. 11, 2017.

* cited by examiner

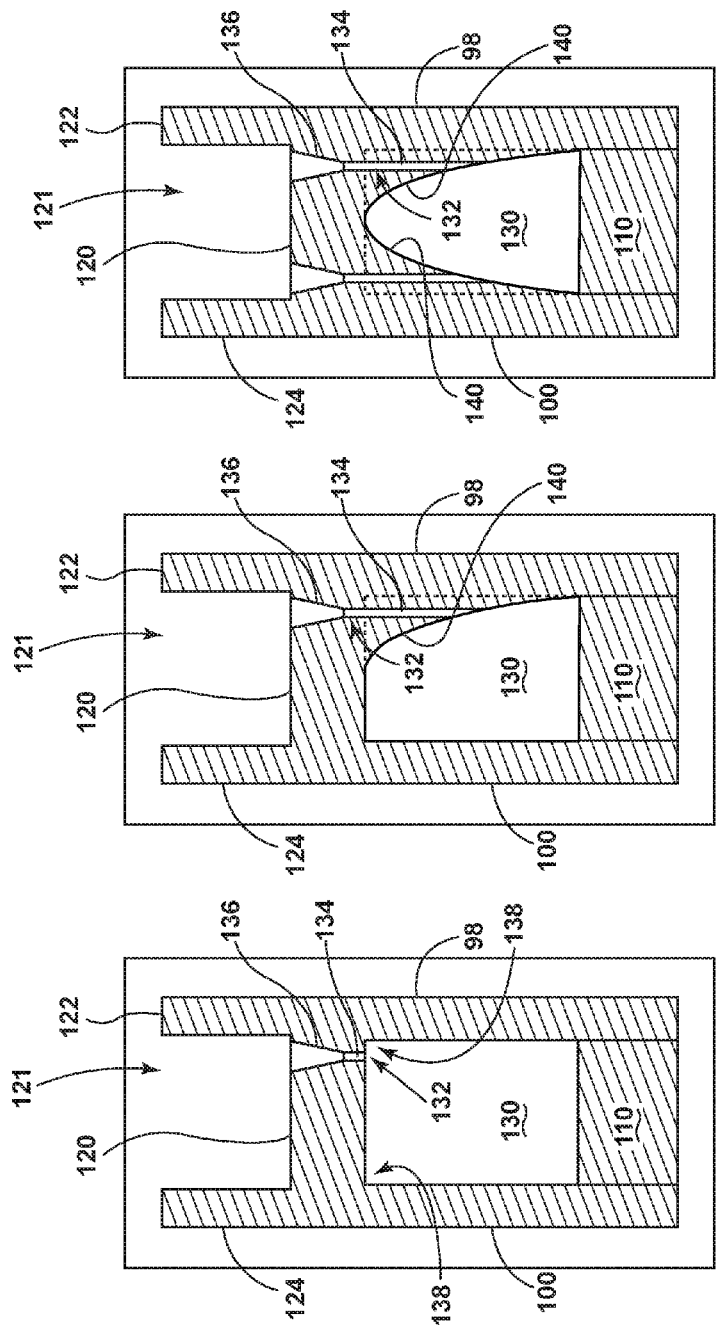

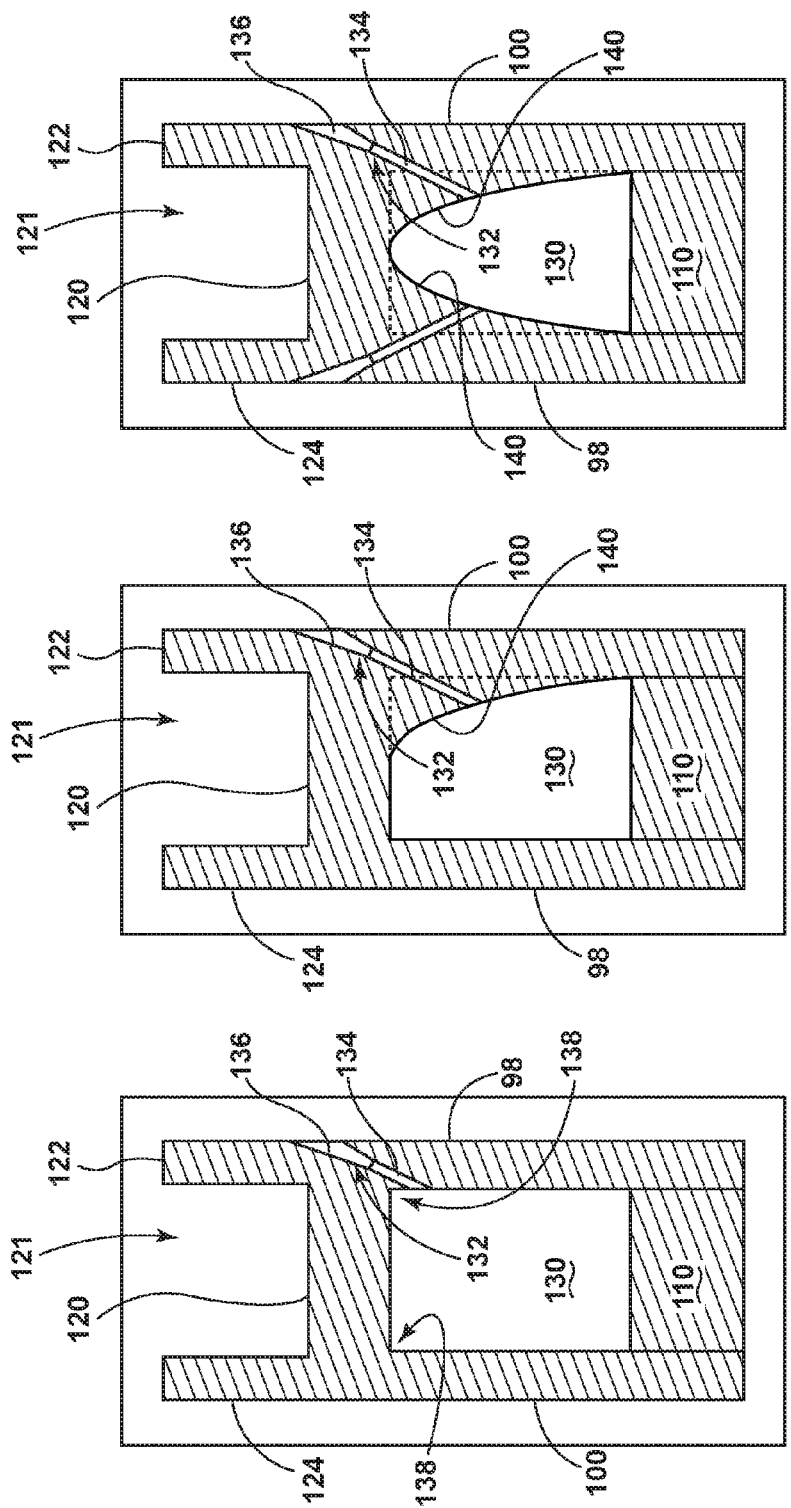

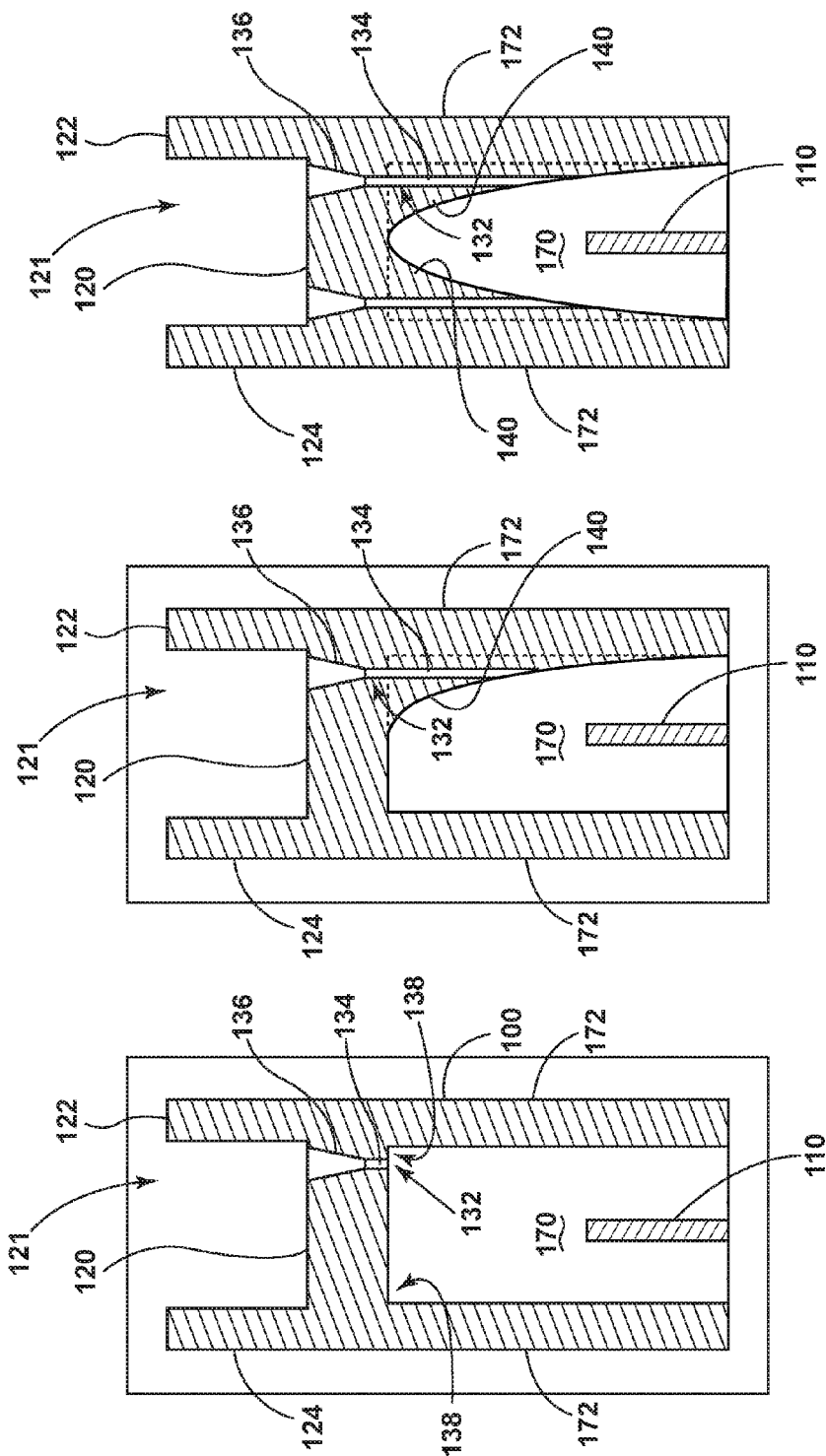

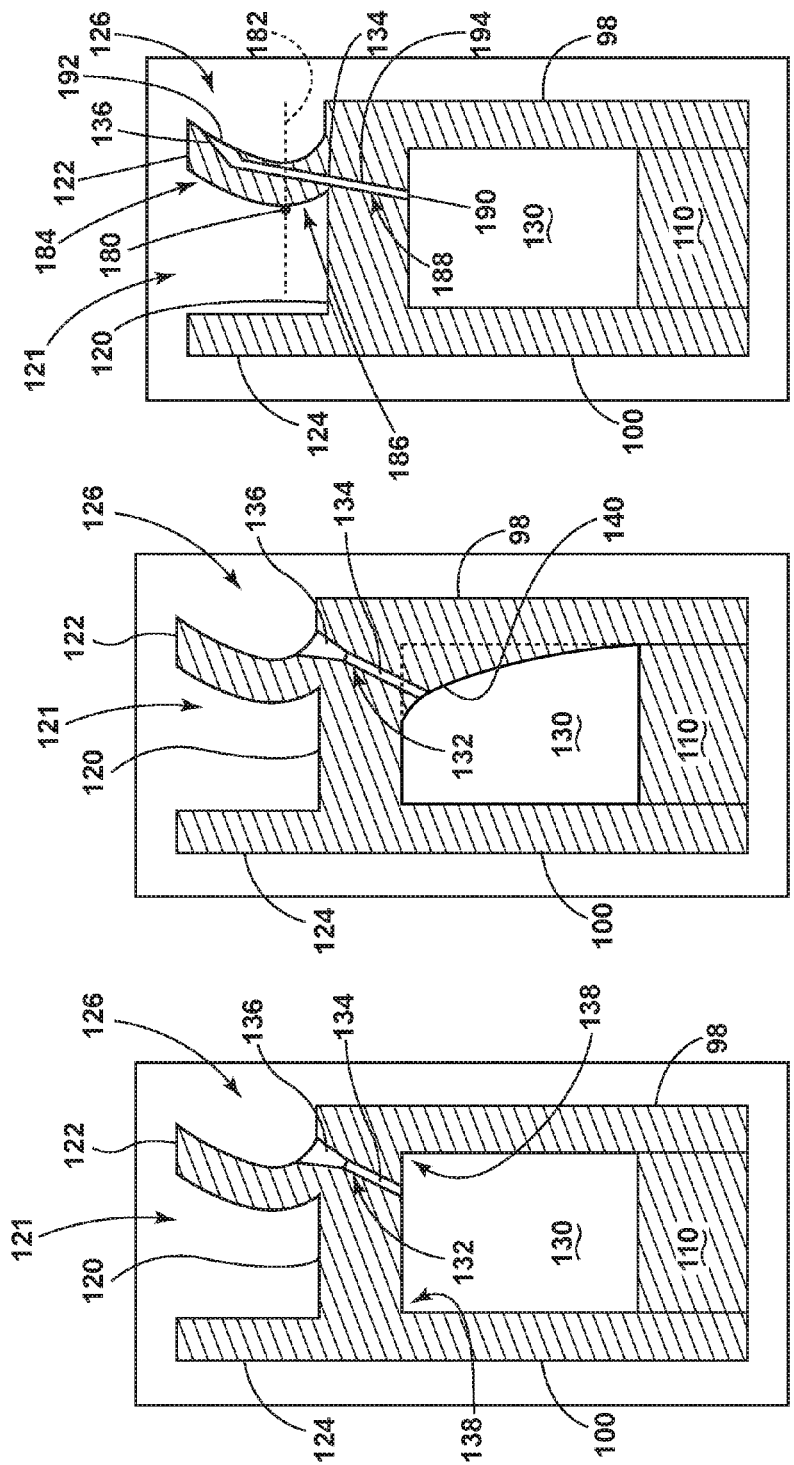

TURBINE ENGINE WITH AN AIRFOIL HAVING A TIP SHELF OUTLET

CROSS-REFERENCE TO RELATED APPLICATIONS

This application is a Continuation-in-part of U.S. application Ser. No. 14/960,991, filed Dec. 7, 2015, now U.S. Pat. No. 10,227,876, issued Jun. 8, 2017, the entirety of which is incorporated herein by reference.

BACKGROUND OF THE INVENTION

Turbine engines, and particularly gas or combustion turbine engines, are rotary engines that extract energy from a flow of combusted gases passing through the engine in a series of compressor stages, which include pairs of rotating blades and stationary vanes, through a combustor, and then onto a multitude of turbine blades. Gas turbine engines have been used for land and nautical locomotion and power generation, but are most commonly used for aeronautical applications such as for airplanes, including helicopters. In airplanes, gas turbine engines are used for propulsion of the aircraft.

Gas turbine engines for aircraft are designed to operate at high temperatures to maximize engine efficiency, so cooling of certain engine components, such as the high pressure turbine and the low pressure turbine, can be beneficial. Typically, cooling is accomplished by ducting cooler air from the high and/or low pressure compressors to the engine components that require cooling. Temperatures in the high pressure turbine are around 1000° C. to 2000° C. and the cooling air from the compressor is around 500° C. to 700° C. While the compressor air is a high temperature, it is cooler relative to the turbine air, and can be used to cool the turbine.

Contemporary turbine blades, as well as vanes or nozzles, generally include one or more interior cooling circuits for routing the cooling air through the blade to cool different portions of the blade, and can include dedicated cooling circuits for cooling different portions of the blade, such as the leading edge, trailing edge and tip of the blade.

BRIEF DESCRIPTION OF THE INVENTION

In one aspect, embodiments of the invention relate to a blade for a turbine engine including an airfoil having an outer wall defining a pressure side and a suction side, extending chord-wise from a leading edge to a trailing edge and span-wise from a root to a tip. The blade further includes a tip wall spanning the pressure side and the suction side of the outer wall, a tip channel defined by the tip wall and between the pressure side and suction side external of the airfoil, and a tip shelf disposed in the pressure sidewall and at least partially defined by the outer wall. At least one film hole extends into the tip shelf having an inlet and an outlet with a passage fluidly coupling the inlet to the outlet. One or more of the inlet and the outlet are shaped to direct cooling flows through the film hole.

In another aspect, embodiments of the invention relate to an airfoil for a turbine engine including an outer wall having a pressure side and a suction side, extending chord-wise from a leading edge to a trailing edge and span-wise from a root to a tip. The airfoil further includes a tip shelf disposed in the outer wall and at least one film hole disposed in the tip shelf having an inlet and an outlet. The outlet is shaped to direct cooling fluid flows through the film hole.

In another aspect, embodiments of the invention relate to a method of flowing a cooling fluid through an engine component including flowing a cooling fluid through a film hole in a tip shelf, and exhausting the cooling fluid from the film hole through an outlet located radially outside of an apex of the tip shelf.

BRIEF DESCRIPTION OF THE DRAWINGS

In the drawings:

FIGS. 7A-7C are cross-sectional views illustrating the increased film hole length by placing a fillet internal of the airfoil adjacent to the tip channel.

FIGS. 8A-8C are cross-sectional views illustrating the increased film hole length with an internal fillet having the film hole extending to a sidewall.

FIGS. 9A-9C are cross-sectional views illustrating the increased film hole length with an internal fillet within an internal serpentine circuit.

FIGS. 10A-10B are cross-sectional views illustrating the increased film hole length with an internal fillet having the film hole extending to a tip shelf.

FIG. 10C is a cross-sectional view of the airfoil having the tip shelf of FIGS. 10A-10B, having a film hole outlet disposed above an apex of the tip shelf.

DESCRIPTION OF EMBODIMENTS OF THE INVENTION

Figure 1:
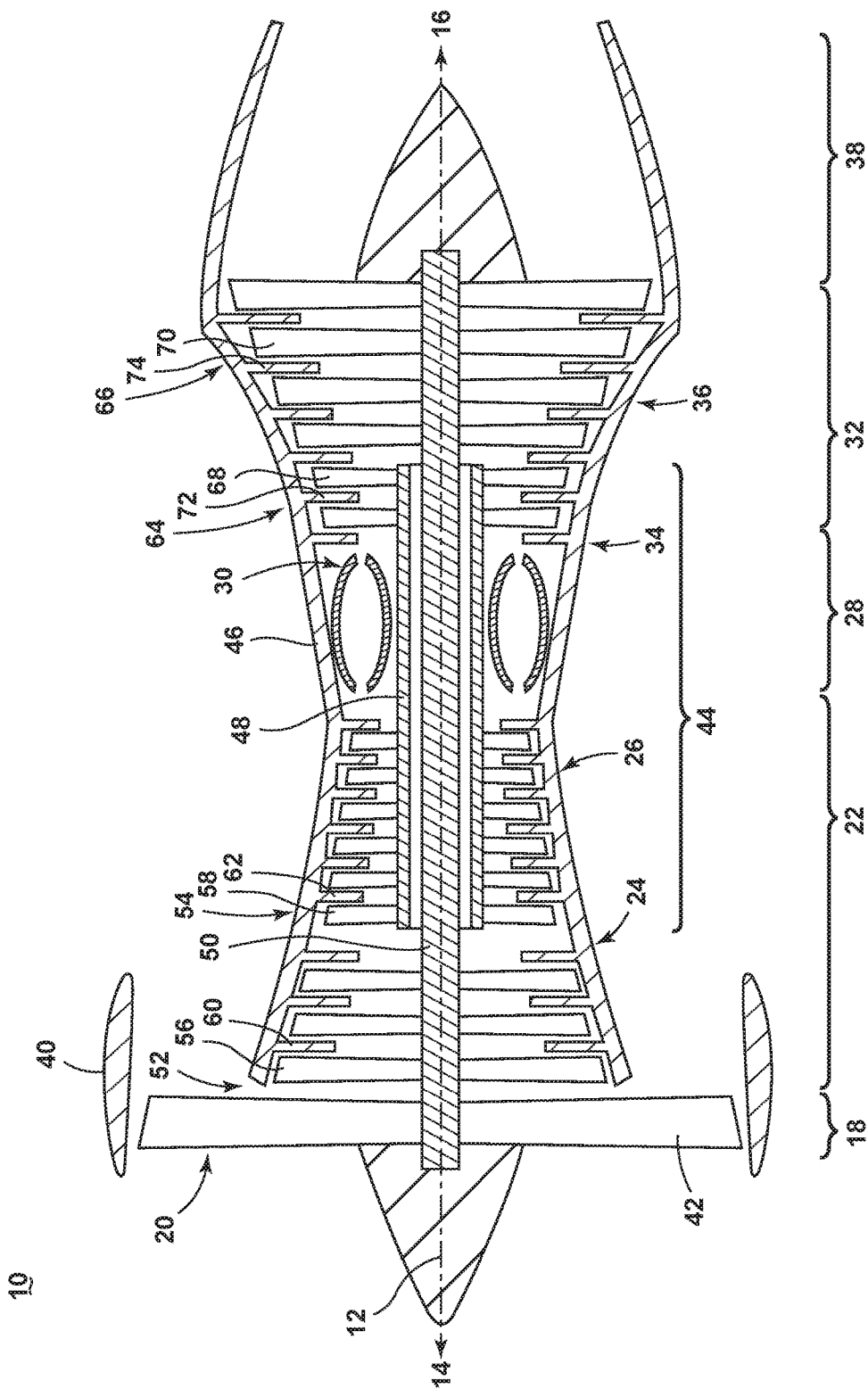
FIG. 1 is a schematic cross-sectional diagram of a gas turbine engine for an aircraft.

The described embodiments of the present invention are directed to apparatuses, methods, and other devices related to routing airflow in a turbine engine. For purposes of illustration, the present invention will be described with respect to an aircraft gas turbine engine. It will be understood, however, that the invention is not so limited and can have general applicability in non-aircraft applications, such as other mobile applications and non-mobile industrial, commercial, and residential applications.

It should be further understood that for purposes of illustration, the present invention will be described with respect to an airfoil for a turbine blade of the turbine engine. It will be understood, however, that the invention is not limited to the turbine blade, and can comprise any airfoil structure, such as a compressor blade, a turbine or compressor vane, a fan blade, or a strut in non-limiting examples. Furthermore, the filleted optimization can have uses in additional engine components utilizing film holes or surface film cooling, such as a band, combustor assembly, or platform in non-limiting examples.

As used herein, the term "forward" or "upstream" refers to moving in a direction toward the engine inlet, or a component being relatively closer to the engine inlet as compared to another component. The term "aft" or "downstream" used in conjunction with "forward" or "upstream" refers to a direction toward the rear or outlet of the engine relative to the engine centerline.

Additionally, as used herein, the terms "radial" or "radially" refer to a dimension extending between a center longitudinal axis of the engine and an outer engine circumference.

All directional references (e.g., radial, axial, proximal, distal, upper, lower, upward, downward, left, right, lateral, front, back, top, bottom, above, below, vertical, horizontal, clockwise, counterclockwise, upstream, downstream, aft, etc.) are only used for identification purposes to aid the reader's understanding of the present invention, and do not create limitations, particularly as to the position, orientation, or use of the invention. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

It should be further understood that as used herein, the term 'fillet' is used to describe material that "fills" in a corner formed by a junction of two intersecting walls. It should be further understood that the intersecting walls can be integral and need not comprise separate intersecting elements. Similarly, the fillet can be integral with the intersecting walls. In the case of the fillet being integral to the intersecting walls, there is no clear demarcation between the fillet and the corner. In such a case, the fillet can be identified by virtually extending the wall thickness until the walls intersect to form a virtual corner.

FIG. 1 is a schematic cross-sectional diagram of a gas turbine engine 10 for an aircraft. The engine 10 has a generally longitudinally extending axis or centerline 12 extending forward 14 to aft 16. The engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a plurality of fan blades 42 disposed radially about the centerline 12. The HP compressor 26, the combustor 30, and the HP turbine 34 form a core 44 of the engine 10, which generates combustion gases. The core 44 is surrounded by core casing 46, which can be coupled with the fan casing 40.

A HP shaft or spool 48 disposed coaxially about the centerline 12 of the engine 10 drivingly connects the HP turbine 34 to the HP compressor 26. A LP shaft or spool 50, which is disposed coaxially about the centerline 12 of the engine 10 within the larger diameter annular HP spool 48, drivingly connects the LP turbine 36 to the LP compressor 24 and fan 20. The portions of the engine 10 mounted to and rotating with either or both of the spools 48, 50 are referred to individually or collectively as a rotor 51.

The LP compressor 24 and the HP compressor 26 respectively include a plurality of compressor stages 52, 54, in which a set of compressor blades 58 rotate relative to a corresponding set of static compressor vanes 60, 62 (also called a nozzle) to compress or pressurize the stream of fluid passing through the stage. In a single compressor stage 52, 54, multiple compressor blades 56, 58 can be provided in a ring and can extend radially outwardly relative to the centerline 12, from a blade platform to a blade tip, while the corresponding static compressor vanes 60, 62 are positioned downstream of and adjacent to the rotating blades 56, 58. It is noted that the number of blades, vanes, and compressor stages shown in FIG. 1 were selected for illustrative purposes only, and that other numbers are possible. The blades 56, 58 for a stage of the compressor can be mounted to a disk 53, which is mounted to the corresponding one of the HP and LP spools 48, 50, with each stage having its own disk. The vanes 60, 62 are mounted to the core casing 46 in a circumferential arrangement about the rotor 51.

The HP turbine 34 and the LP turbine 36 respectively include a plurality of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine blades 68, 70 can be provided in a ring and can extend radially outwardly relative to the centerline 12, from a blade platform to a blade tip, while the corresponding static turbine vanes 72, 74 are positioned upstream of and adjacent to the rotating blades 68, 70. It is noted that the number of blades, vanes, and turbine stages shown in FIG. 1 were selected for illustrative purposes only, and that other numbers are possible.

In operation, the rotating fan 20 supplies ambient air to the LP compressor 24, which then supplies pressurized ambient air to the HP compressor 26, which further pressurizes the ambient air. The pressurized air from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the engine 10 via the exhaust section 38. The driving of the LP turbine 36 drives the LP spool 50 to rotate the fan 20 and the LP compressor 24.

Some of the ambient air supplied by the fan 20 can bypass the engine core 44 and be used for cooling of portions, especially hot portions, of the engine 10, and/or used to cool or power other aspects of the aircraft. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid can be, but is not limited to, fluid discharged from the LP compressor 24 or the HP compressor 26.

Figure 2:
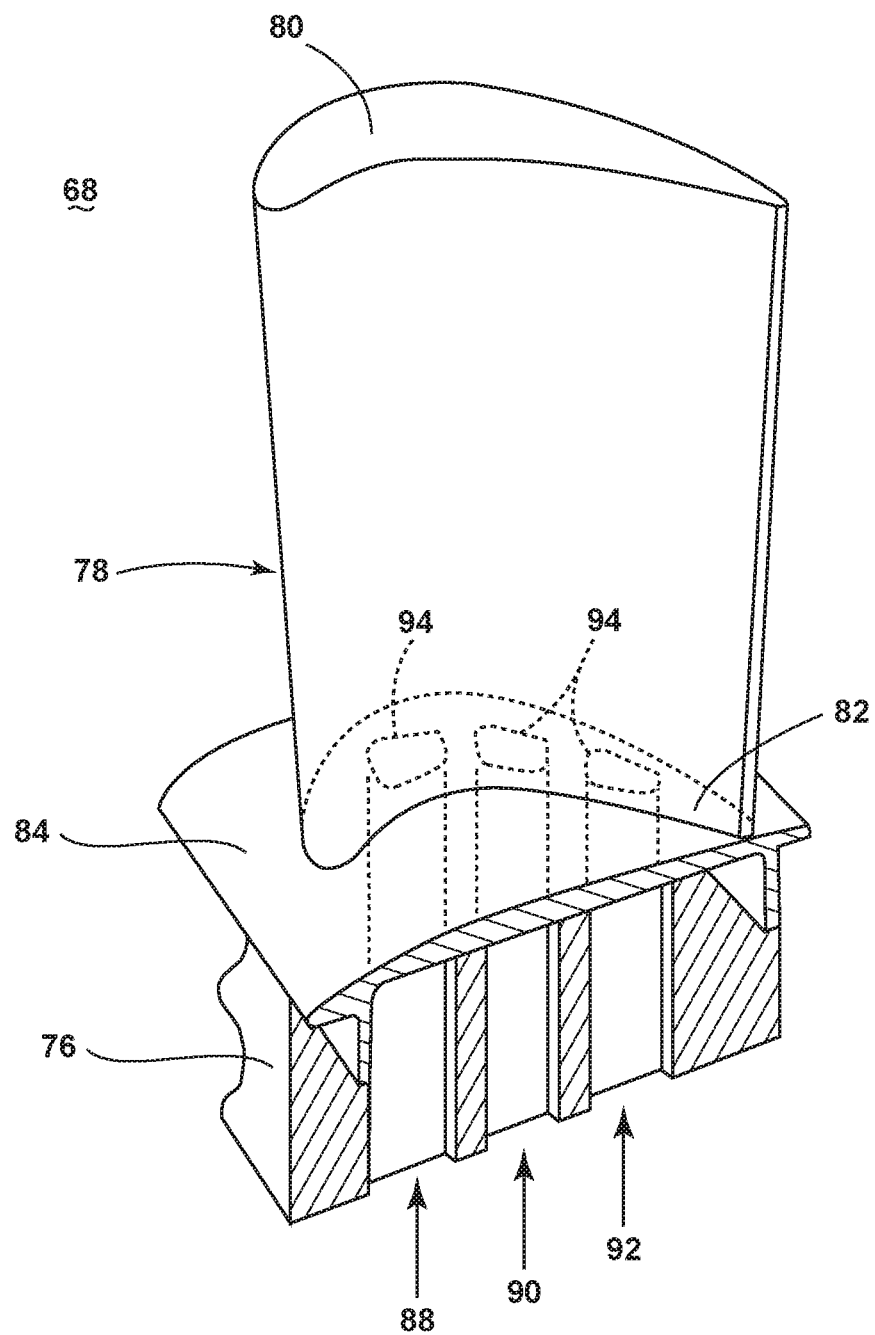
FIG. 2 is a perspective view of an engine component in the form of a turbine blade of the engine of FIG. 1 with cooling air inlet passages.

FIG. 2 is a perspective view of an engine component in the form of one of the turbine blades 68 of the engine 10 from FIG. 1. The turbine blade 68 includes a dovetail 76 and an airfoil 78. The airfoil 78 extends from a tip 80 to a root 82. The dovetail 76 further includes a platform 84 integral with the airfoil 78 at the root 82, which helps to radially contain the turbine airflow. The dovetail 76 can be configured to mount to a turbine rotor disk on the engine 10. The dovetail 76 comprises at least one inlet passage, exemplarily shown as a first inlet passage 88, a second inlet passage 90, and a third inlet passage 92, each extending through the dovetail 76 to provide internal fluid communication with the airfoil 78 at a passage outlet 94. It should be appreciated that the dovetail 76 is shown in cross-section, such that the inlet passages 88, 90, 92 are housed within the body of the dovetail 76.

Figure 3:
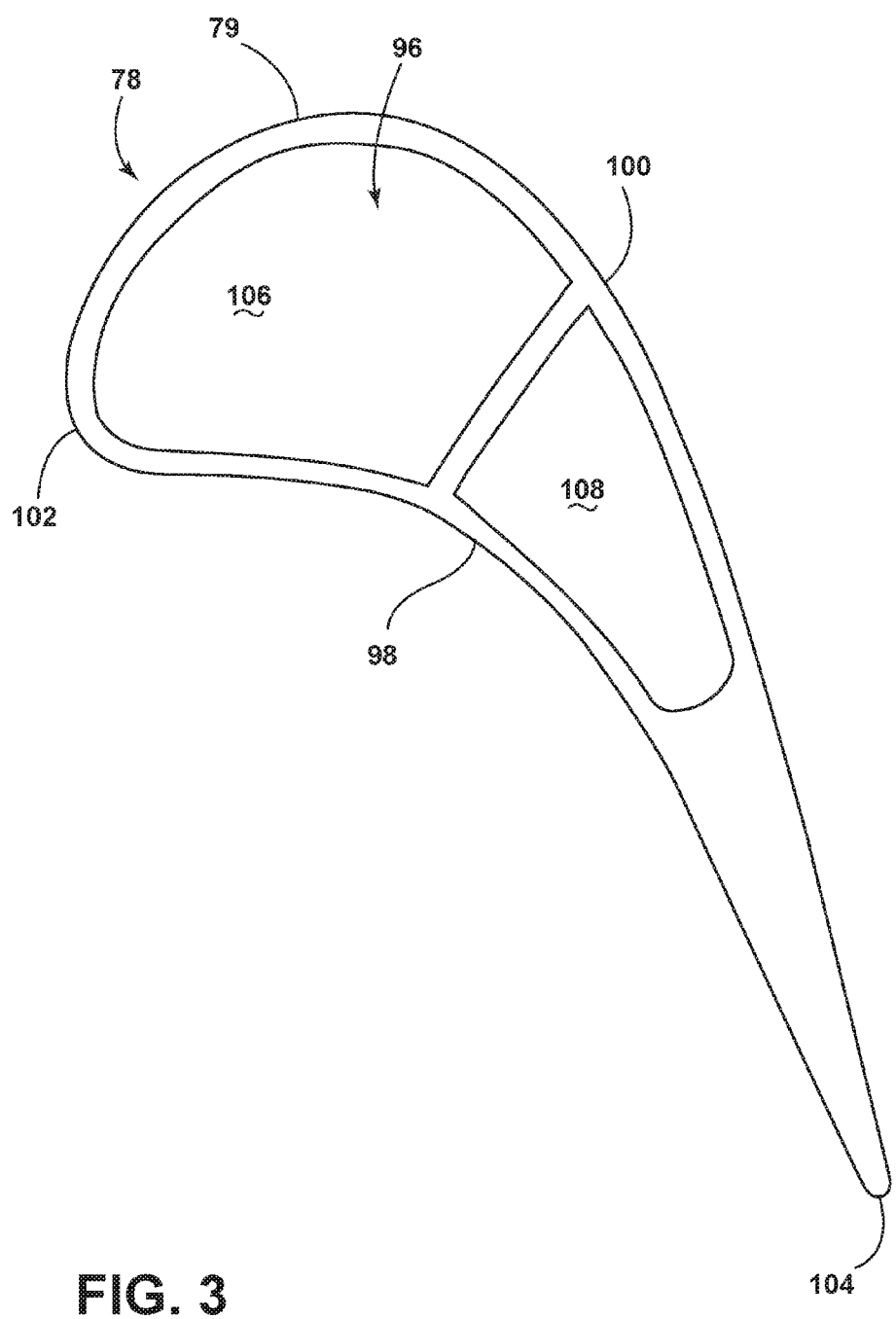
FIG. 3 is a cross-sectional view of the airfoil of FIG. 2.

Turning to FIG. 3, the airfoil 78, shown in cross-section, has an outer wall 79 defined by a concave-shaped pressure sidewall 98 and a convex-shaped suction sidewall 100 which are joined together to define an airfoil shape with a leading edge 102 and a trailing edge 104. The airfoil 78 rotates in a direction such that the pressure sidewall 98 follows the suction sidewall 100. Thus, as shown in FIG. 3, the airfoil 78 would rotate upward toward the top of the page.

The airfoil 78 can comprise an interior 96 with a plurality of internal passages, illustrated by example as a first passage 106 and a second passage 108, separated by a rib 110, which can be arranged to form one or more cooling circuits dedicated to cool a particular portion of the airfoil 78. The passages 106, 108 can extend radially within the airfoil 78, from root-to-tip. It should be appreciated that the passages can comprise one or more film holes that can provide fluid communication between the particular passage and the external surface of the airfoil 78, providing a film of cooling fluid along the external surface of the airfoil 78.

Figure 4:
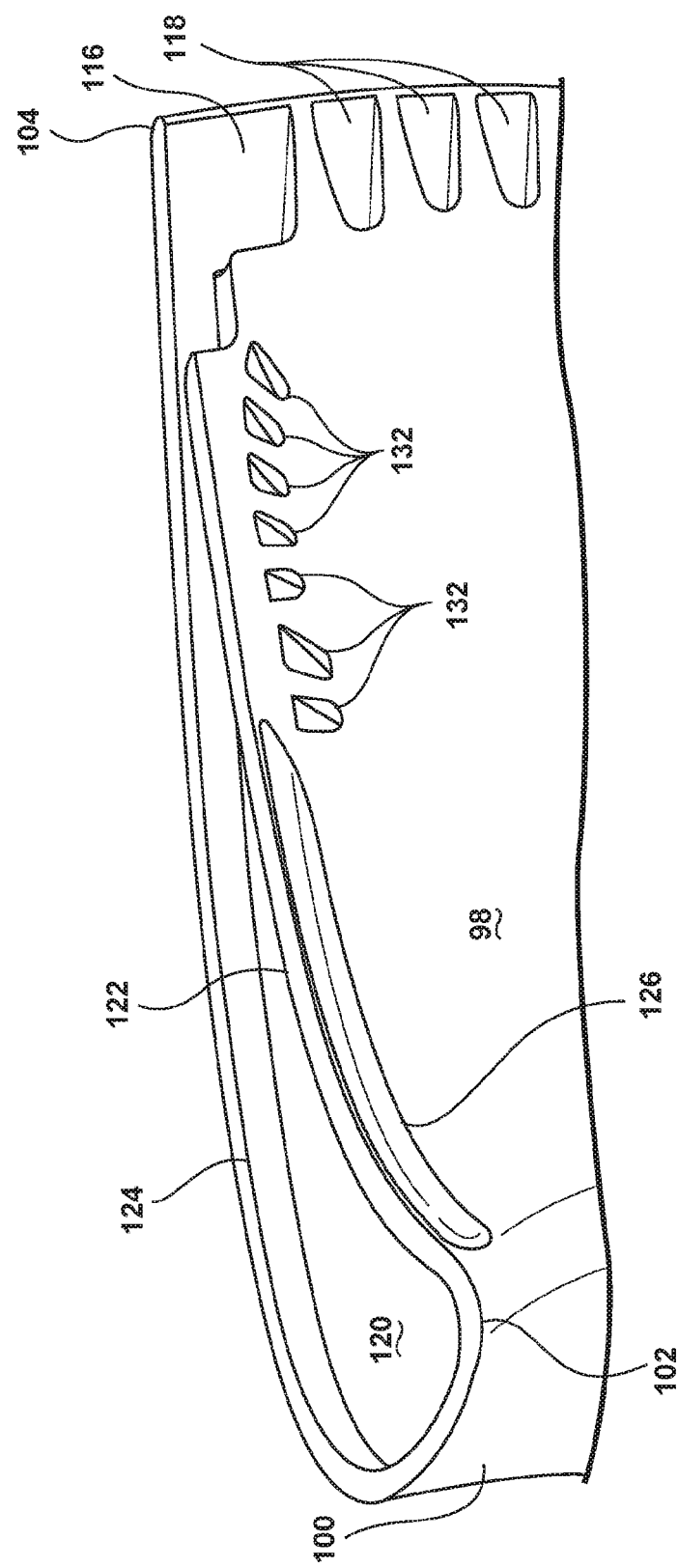
FIG. 4 is a perspective view of a tip of the airfoil of FIG. 2 illustrating a tip channel and a tip shelf.

In FIG. 4, a perspective view best illustrates the tip 80 of the airfoil 78. The pressure and suction sidewalls 98, 100 extend beyond the top surface of the tip 80 such that the top surface is defined as a tip wall 120 disposed between a pressure side extension 122 and a suction side extension 124. The combination of the tip wall 120, and the extensions 122, 124 can define a tip channel 121 disposed along the tip 80. A tip shelf 126 can be defined in the pressure side extension 122 as a groove located on the pressure sidewall 98. The airfoil 78 can further have one or more film holes 132 disposed therein, having the film holes 132 exemplarily illustrated on the pressure sidewall 98. Additionally, the airfoil 78 can have a plurality of exit apertures shown as slot channels 118 at the trailing edge 104, having a tip exit 116 disposed at the trailing edge adjacent the tip 80. Alternatively, a center extension (not shown) can extend from the tip wall 120 between the pressure and suction extensions 122, 124, dividing the tip channel 121 into separate tip channels.

Figure 5:
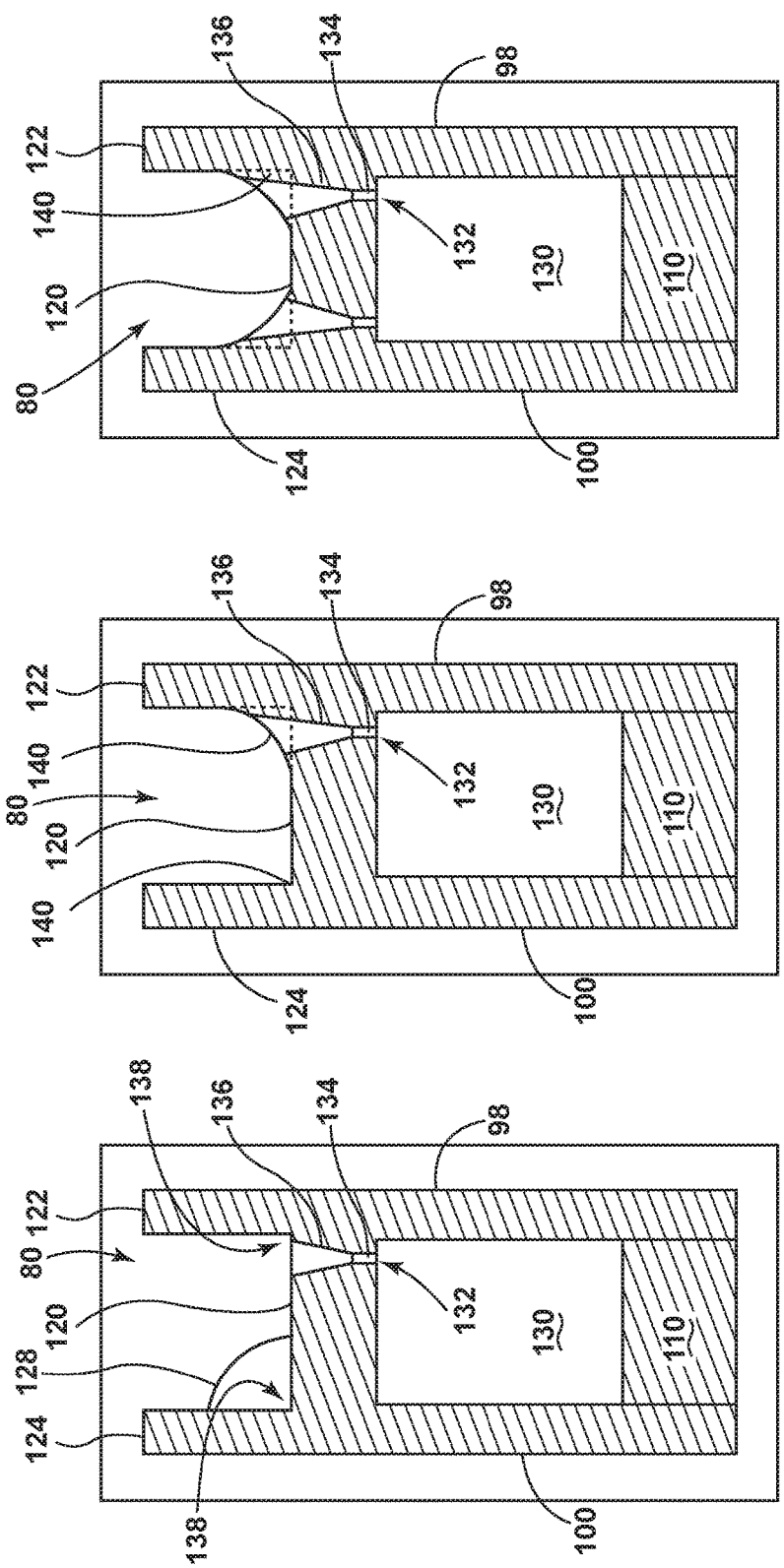
FIGS. 5A-5C are cross-sectional views illustrating an increased film hole length by placing a fillet in the tip channel.

Turning now to FIGS. 5A-5C, a cross-sectional view illustrates a cooling passage as a tip passage 130, which can comprise the first or second passages 106, 108 of FIG. 3. FIG. 5A is a prior art tip 80 for the airfoil 78 having a film hole 132 extending between the tip passage 130 and the exterior of the airfoil 78 at the tip wall 120. The tip passage 130 can have either a symmetrical or an asymmetrical cross-section. The film holes 132 can be a compound film hole, having a first portion 134 and a second portion 136, which can define a metering section and a diffusing section, respectively. The compound angle of the film holes can be defined as having both an axial component and a radial component relative to the engine centerline 12. Alternatively, the compound film hole can be defined as having a span-wise component and a chord-wise component, relative to the span and the chord of the airfoil 78. Thus, it can be understood that although the film holes 132 are shown in cross-section being substantially radial, i.e. orthogonal to the engine centerline 12, the film holes 132 can also extend in an axial direction relative to the engine centerline 12, or a combination of axial and radial. Furthermore, the film holes 132 can be non-linear, defining at least a portion of an arcuate profile. The film holes 132 are not restricted to being compound. They can be axial, radial, linear, angled, compound, arcuate or otherwise in non-limiting examples. Thus, a centerline of the film hole 132 can be straight, curved, arcuate, jointed, or otherwise.

A plurality of corners 138 can be defined at the junctions between the tip wall 120 and the pressure and suction wall extensions 122, 124. While the corners 138 are shown as sharp corners having a defined point, it should be appreciated that they are not so limited. For example, the corners 138 can be slightly rounded, or otherwise, such that a virtual corner can be defined. A corner angle 128 can be defined at each corner 138. The intersecting walls to define the corner 138 can intersect in a manner that defines an acute, right, or obtuse angle 128 for the corner 138. Additionally, one or more of the intersecting walls can be angled or arcuate, such that the corner 138 comprises an increasing cross-sectional distance extending from the corner 138 at the junction between the two walls.

Turning to FIG. 5B, the corner 138 adjacent the pressure side extension 122 and the tip wall 120 comprises a fillet 140. The fillet 140 defines an increased thickness at the corner 138 such that the length of the film hole 132 can be extended. In FIG. 5C, the fillets 140 can be disposed adjacent to either the pressure side extension 122, the suction side extension 124, or both. It should be further appreciated that nominally rounded corners are not equivalent to the fillets described herein. The fillets 140 define an increased thickness, while the slightly rounded corner can be nominal.

Figure 6:
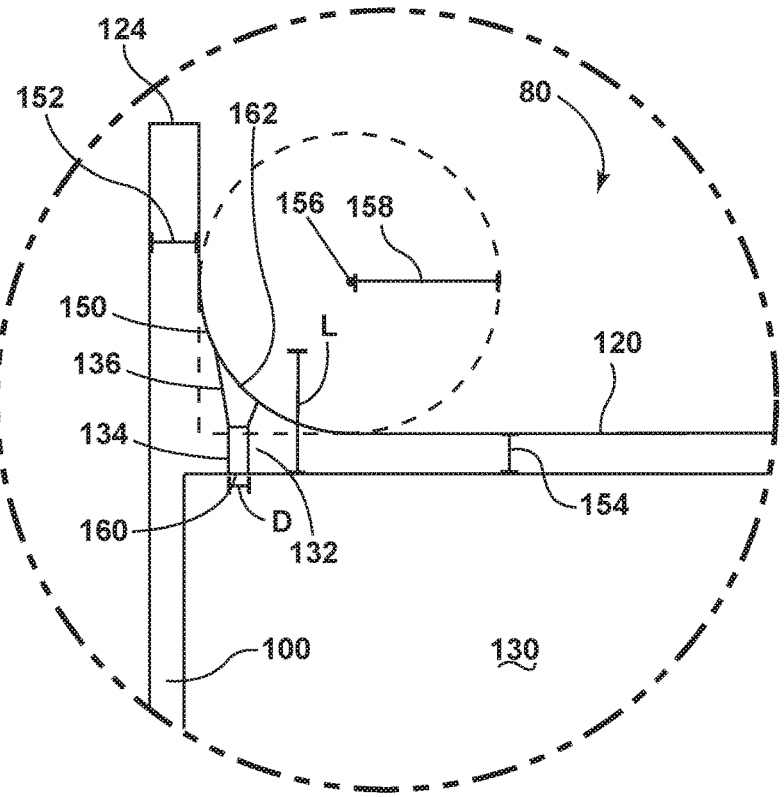
FIG. 6 is a schematic view illustrating the increased film hole length with an external fillet at the tip of the airfoil.

Turning now to FIG. 6, the fillet 140 as shown is exemplarily and should be understood that the fillets 140 are a material filling the corner 138 at the junction of intersecting walls, defining an increased thickness. The geometries as shown in FIG. 6 should be understood as exemplary, and should not be construed as limiting of the invention. Alternatively, the fillet 140 could be defined as a compound fillet, having discrete arcuate or linear surfaces defining the fillet 140.

A length L can be defined as the length between an inlet 160 and an outlet 162 of the film hole 132 and a diameter D can be defined as the cross-sectional width of the film hole 132. The length can be determined as the distance between the inlet 160 and the outlet 162 through the center of the film hole 132 where the centerline intersects the airfoil surface. As such, the film hole 132 can be defined by the length-to-diameter ratio, L/D. While the film holes 132 are illustrated as having an increasing cross-sectional area at the second portion 136, it should be understood that the film holes 132 can comprise a consistent diameter D and cross-sectional area. Alternatively, the centerline of the film hole 132 can be straight, curved, arcuate, jointed, and any other suitable shape in non-limiting examples.

The suction sidewall 100 and the suction sidewall extension 124 can have a thickness 152 defined as a width for the wall. Similarly, the tip wall 120 can have a thickness 154. The increased thickness of the fillet 140 can be defined against the virtual extensions of the walls 120, 124, shown in dashed line, such that the extensions 120, 124 at the fillet 140 have an increased thickness being greater than the thicknesses 152, 154 of the respective walls 120, 124. It should be understood that the fillets 140 need not comprise additional material, but can be integral with at least one of the walls 120, 124 and can define a thickness against the virtual extensions of the walls 120, 124 shown in dashed lines adjacent the fillet 140. It should be further appreciated that the virtual extensions of the walls are for illustrative purposes, providing the reader with a means of visual comparison of the thickness of the fillet 140 against the wall thicknesses 120, 124, and such an extension of the walls adjacent the fillet 140 are not required.

The fillet 140 can define at least a portion of a circle or an arcuate surface 150, such that an effective radius 158 is defined between the fillet 140 and a center point 156 of the arcuate surface 150. The fillet 140 comprises a thickness extending between the corner 138, shown in dashed line, and the arcuate surface 150. The fillet 140 is shaped such that the effective radius 158 is at least 1.5 times larger than the greater of the first or second thickness 152, 154. Alternatively, the shape and size of the fillet 140 can adapted to increase the length of the film holes 132. Increasing the length L of the film holes 132 increases the value for the L/D ratio for the film holes 132. Furthermore, the angle 128 (FIG. 5A) defined by the corner 138 can provide for an increased or decreased effective radius 158. For example, the filleted corner 138, as illustrated, is a right angle providing for an effective radius 158 of approximately 2.0-2.5 times the larger of the thicknesses 152, 154. In alternative corners 138 where the angle 128 is acute or obtuse, for example, the fillet 140 can define an effective radius, which can be greater of smaller than the exemplary embodiment shown. As such, the fillet 140 can define an effective radius of 1.5 to 10.0 times the thicknesses 152, 154, or more. It should be understood, however, that the thickness defined by the fillet 140 is not limited to being defined by the angle 128 of the intersecting walls 120, 124.

While the thicknesses 152, 154 are shown in reference to the tip wall 120 and the suction sidewall extension 124, it should be appreciated that the respective geometries of the tip passage 130 within the airfoil 78 as shown is exemplary and should not limit the airfoil 78 to the geometries, dimensions, proportions, or positions as shown. The fillet 140 can be defined in additional places at the tip 80 of the airfoil 78 and will be fully described in the examples shown in FIGS. 7-10.

It should be further appreciated that the circle shape defined by the fillet 140 is exemplary. The fillet 140 need not be shaped such that fillet 140 defines the circle shape. The fillet 140 can be any arcuate shape or segment thereof, such that a radius or local radius can define the effective radius 158. The fillet 140 can be a non-circular arc, such that a segment of the arc or at least a portion of the fillet 140 can define a local radius to comprise the effective radius 158. Alternatively, the fillet 140 could be defined as a compound fillet with a compound radius of curvature, having discrete arcuate or linear surfaces defining the fillet 140. When utilizing a compound radius of curvature defined by the fillet 140, the average overall radius could be used to determine the effective radius 158. Further still, the fillets 140 accommodate film hole inlet or exit shaping, as well as non-linear geometries. As such, exit shaping should be understood as any shape other than a standard round inlet or exit.

Turning now to FIGS. 7A-9B, multiple examples for implementation of a fillet 140 near the tip 80 are shown. In FIGS. 7A-7C, the fillet 140 can be disposed within the tip passage 130 of the airfoil. Looking at FIG. 7A, showing a prior art blade tip, the corners 138 can be defined internal of the airfoil 78, adjacent to the tip wall 120 and the pressure and suction sidewalls 98, 100. In FIG. 7B, the fillet 140 is disposed adjacent to the pressure sidewall 98, providing for an increased length for the film hole 132, such that the L/D ratio defined by the film hole 132 can be increased. FIG. 7C shows an additional exemplary embodiment having a fillet 140 adjacent to both the pressure and suction sidewalls 98, 100. Thus, it should be understood that the fillet can be disposed adjacent to the pressure sidewall 98, the suction sidewall 100, or both.

Turning now to FIGS. 8A-8C, the tip 80 of the airfoil has film holes 132 extending from the tip passage 130 to the pressure sidewall 98 of the airfoil 78. In FIG. 8A illustrating a prior art blade tip, similar to FIG. 7A, the corners 138 are defined adjacent to the tip wall 120 and the pressure and suction sidewalls 98, 100. The film hole 132 extends through the pressure sidewall 98 providing fluid communication between the tip passage 130 and the side of the airfoil 78.

In FIG. 8B, the corner 138 adjacent to the pressure sidewall 98 comprises the fillet 140, providing for an increased L/D ratio for the film hole 132 extending to the external surface of the pressure sidewall 98. In FIG. 8C, another example illustrates the potential to have both a film hole 132 disposed on the pressure and suction sidewalls 98, 100. Thus, it should be understood that the film hole 132 can be disposed through the fillet 140 to either the pressure sidewall 98, the suction sidewall 100, or both.

Turning now to FIGS. 9A-9C, another example illustrates fillets 140 being disposed within a serpentine section of an internal cooling circuit. Looking at FIG. 9A, showing a prior art turn 170 of a cooling circuit as the tip passage, the corners 138 can be defined at the junction between the tip wall 120 and one or more internal ribs 172, extending along the radial, span-wise length of the airfoil 78. Turning to FIGS. 9B and 9C, the fillets 140 can be placed at the corners defined against the internal ribs 172 at the tip wall 120. The fillets 140 can be utilized to increase the length of the film holes 132 defining a greater L/D ratio for the film holes to increase film cooling effectiveness at the tip 80.

Turning to FIGS. 10A-10B, the tip 80 of the airfoil 78 with the tip shelf 126 disposed in the pressure sidewall 98. In FIG. 10A, similar to FIGS. 7 and 8, the corners can be disposed within the tip passage 130 adjacent to the tip wall 120 and the pressure and suction sidewalls 98, 100. The film hole 132 is disposed in the tip wall 120 and extends to the tip shelf 126. In FIG. 10B, the corner 138 adjacent to the pressure sidewall 98 at the tip shelf 126 can comprise a fillet 140, providing for an increased L/D ratio for the film hole 132 extending to the tip shelf 126. Alternatively, it is contemplated that the fillet 140 can be between the tip wall 120 and the side extension 122 at the tip shelf 126, being external of the airfoil and located within the tip channel 121.

The film hole 132 at the tip shelf 126 can be a shaped film hole or comprise a compound film hole as described herein. The film hole 132 can be disposed on any surface of the tip shelf 126, such as a fillet, bottom shelf surface, radial face, or any combination thereof. Additionally, the film hole 132 can have any orientation, being radial, axial, tangential, or any combination thereof. The film hole 132 can extend from the filleted surface 140 to the tip shelf 126 or from the tip wall 120 through a portion of the filleted surface 140, being interior of or exterior of the airfoil, to the tip shelf 126. The fillet 140 provides for an increased length for the film hole 132, defining a greater L/D ration for the film hole 132 to improve film effectiveness.

FIG. 10C illustrates the arcuate tip shelf 126 similar to that of FIGS. 10A-10B. A tip shelf apex 180 can be the furthest arcuate extent of the tip shelf 126, or the pressure extension 122 defining the tip shelf 126, into the tip channel 121. Alternatively, the apex 180 can be defined as the furthest distance extent in the tangential direction from the pressure sidewall 98. An apex axis 182 can be defined through the pressure extension 122 intersecting the tip shelf apex 180, disposed parallel to the tip wall 120. An outer section 184 and an inner section 186 of the pressure extension 122 can be defined by the apex axis 182. A film hole 188 includes an inlet 190 and an outlet 192, with a passage 194 fluidly coupling the inlet 190 to the outlet 192. The second portion 136, which can be an expansion section of the film hole 132, can be disposed at least partially in the outer section 184, having the outlet 192 of the film hole 132 disposed entirely within the outer section 184. Alternatively, it is contemplated that the outlet 192 and the second portion 136 can be wholly disposed without the outer section 184, or partially within the outer section 184.

The inlet 190, outlet 192, and passage 194 can be shaped to direct a flow of fluid entering the film hole 132, passing through the film hole 132, or exhausting from the film hole 132. Such shaping, for example, can include a converging, diverging, or metering section to direct the flow of fluid, in non-limiting examples. The converging section can increase the flow velocity of the flow of fluid, the diverging section can decrease the flow velocity of the flow of fluid, and the metering section can meter the flow of fluid passing through it. Additional shaping can include an expansion section or a reduction section. The expansion section can include an increasing cross-sectional area to form a diffusion section and the reduction section can include a decreasing cross-sectional area. Additionally, the shaping of the film hole 132 can include a non-linear film hole. Such a film hole could include curved passages or follow the curvature of the tip shelf.

Figure 11A:
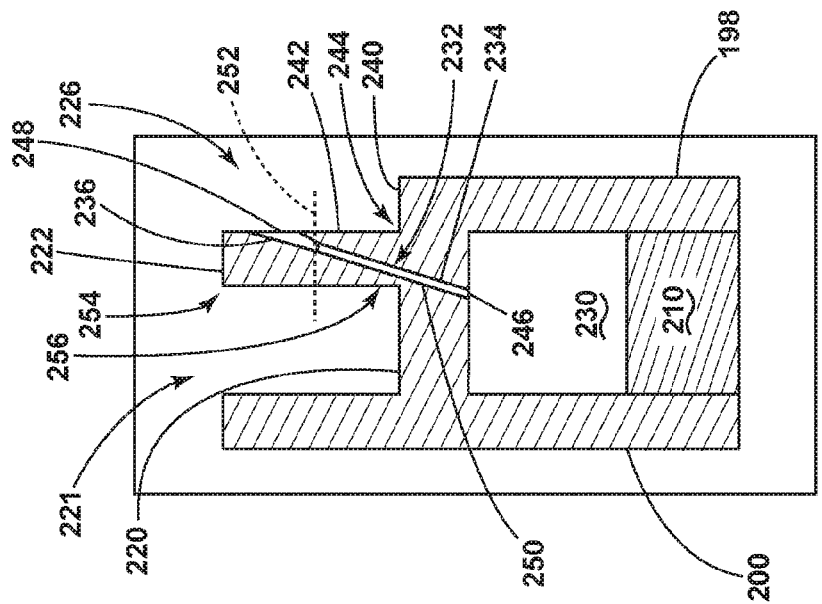
FIGS. 11A-11C illustrate cross-sectional views of the airfoil having the tip shelf defined by a linear pressure extension showing different positions for the film hole outlet.
Figure 11B:
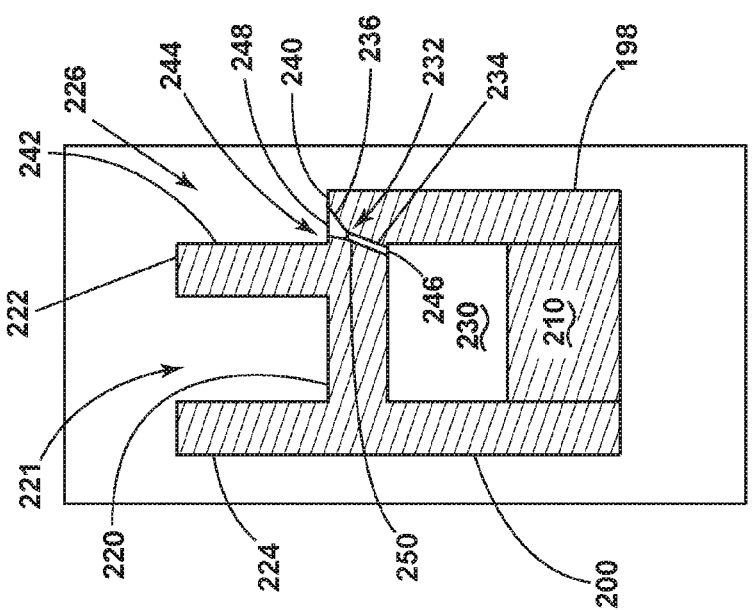
Figure 11C:
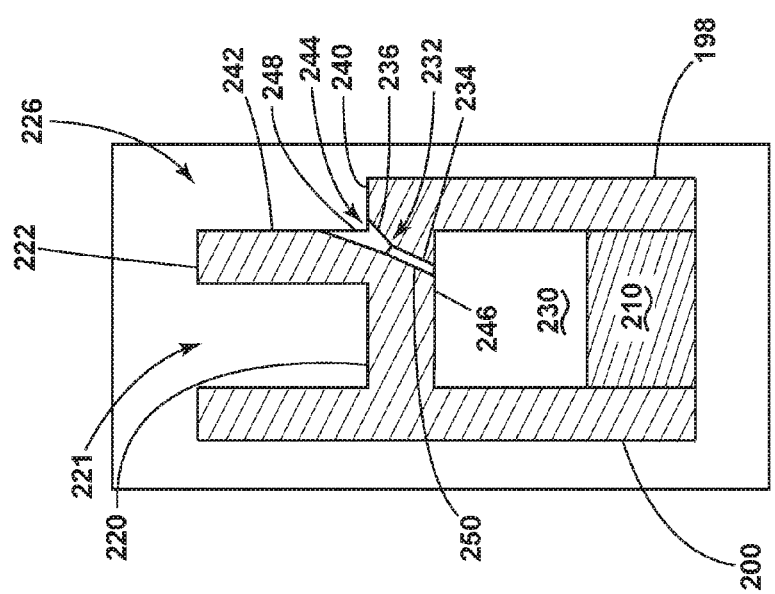

Referring to FIGS. 11A-11C, another embodiment of a tip shelf 226 is illustrated, having a squared profile defined by a linear pressure extension 222 and a flat bottom wall 240, being parallel to and aligned with the tip wall 220. A rib 210 extends into a tip passage 230 interior of the airfoil. A tip channel 221 is defined between the pressure extension 222 on a pressure sidewall 198 and a suction extension 224 at a suction sidewall 200. A flat face 242 is defined by the pressure extension 222 within the tip shelf 226. A corner 244 is defined at the intersection between the pressure extension 222 and the bottom wall 240. The tip shelf 226 is in fluid communication with a film hole 232. The film hole 232 has an inlet 246, and outlet 248, and a passage 250, fluidly coupling the inlet 246 to the outlet 248. The film hole 232 can be shaped, having a first portion 234 and a second portion 236, the first portion 234 connected to the inlet 246 and the second portion 236 connected to the outlet 248. It should be appreciated that the film hole as depicted need not be aligned with the interior rib 210 and can be positioned along any length chord-wise position of the airfoil.

Referring now to FIG. 11A, the film hole 232 can extend from a tip passage 230 to the tip shelf 226. The outlet 248 is disposed entirely within the bottom wall 240. While the outlet 248 is disposed entirely on the bottom wall 240, it is contemplated that the adjacent corner 244 is filleted or arcuate, while still defining the linear bottom wall 240.

Referring to FIG. 11B the film hole 232 is disposed at least partially on the pressure extension 222, having the outlet 248 on the face 242. An extension axis 252 can divide the pressure extension 222 into an outer section 254 and an inner section 256. In one example, the extension axis 252 can be disposed at the middle of the pressure extension 222 defined from the tip shelf 226, dividing the outer and inner sections 184, 186 into equal sizes. Alternatively, the pressure extension 222 can be segmented, or otherwise divided. Such a division or segmentation can be used to define the extension axis 252. As such, the outer section 254 and the inner section 256 need not be equal sizes.

An outlet 248 for the film hole 232 is disposed on the pressure extension 222 wholly within the outer section 254. Alternatively, the outlet 248 can be disposed at least partially within the outer section 254. Positioning the outlet 248 in the outer section 254 on the face 242 provides for an increased length for the film hole 232 for providing a flow of fluid to the tip shelf 226, which provides an increased effectiveness for providing a fluid from the film hole 132.

Referring to FIG. 11C, the face 242 of the pressure extension 222 intersects the bottom wall 240 to define the corner 244. The outlet 248 can be disposed in the corner 244. Such an orientation can provide a flow of fluid to both the face 242 and the bottom wall 240 or provide the flow of fluid along the corner 244. Providing, for example, a cooling fluid along the corner 244 can provide for improved cooling at the corner 244 where the increased wall thickness can otherwise result in increased temperatures. Reducing such temperatures can improve lifetime of the airfoil. Additionally, the corner 244 can be radiused or filleted, defining an arcuate surface upon which the outlet 248 can be formed.

It should be understood that the film hole 232, including the inlet 246, outlet 248, or passage 250, can be shaped to direct a flow of fluid passing through the film hole 232. Such shaping can include, but is not limited to, converging, diverging, or metering sections. The shaping can improve film cooling or reduce the required amount of fluid provided through the film holes 232. The converging section can increase the flow velocity of the flow of fluid, the diverging section can decrease the flow velocity of the flow of fluid, and the metering section can meter the flow of fluid passing through it. Additional shaping can include an expansion section or a reduction section. The expansion section can include an increasing cross-sectional area to form a diffusion section and the reduction section can include a decreasing cross-sectional area.

Figure 12A:
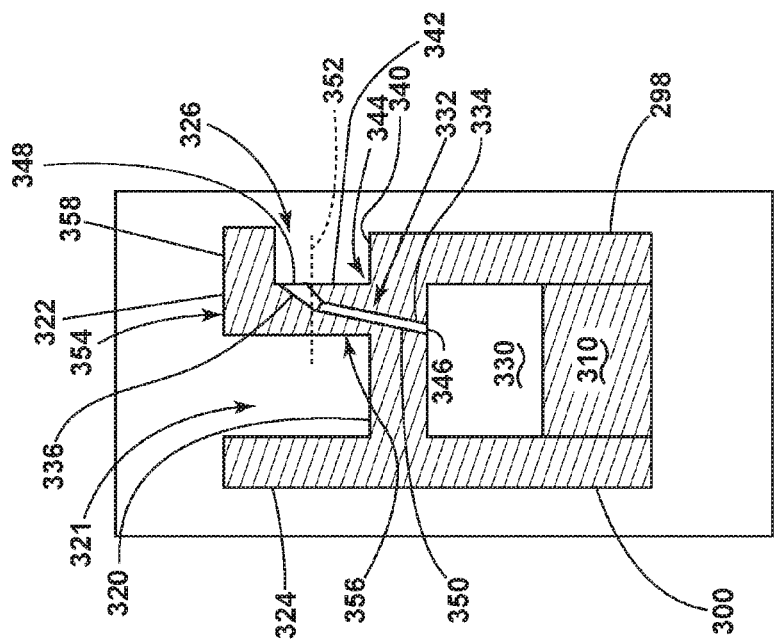
FIGS. 12A-12C illustrate cross-sectional views of the tip shelf having an arm defining the tip shelf, showing different positions for the film hole outlet.
Figure 12C:
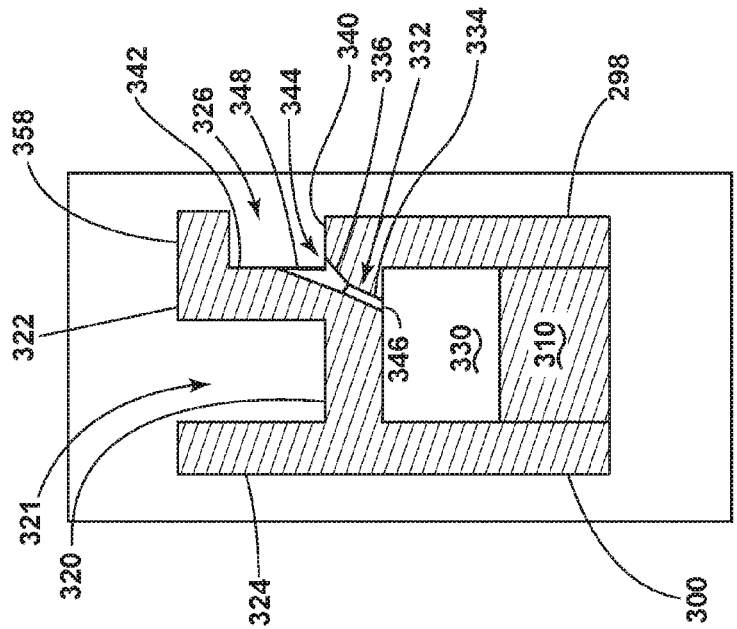
Figure 12B:
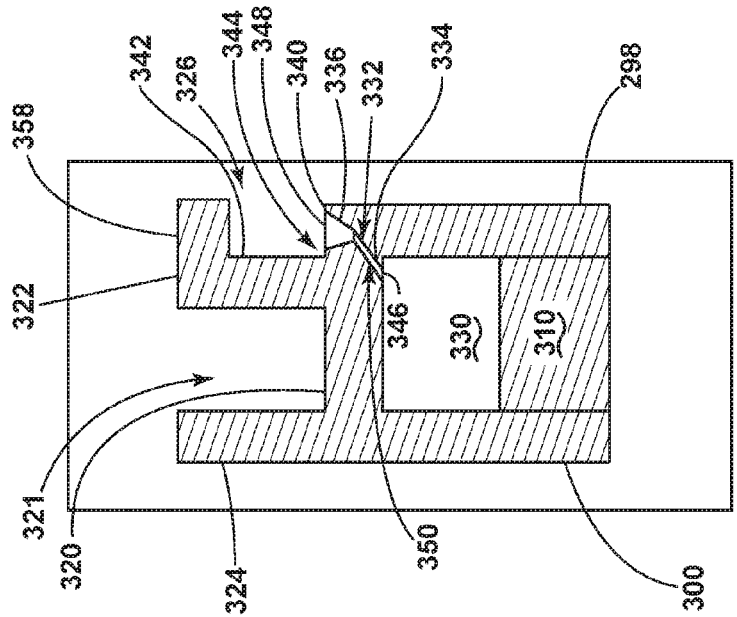

Referring now to FIGS. 12A-12C, a tip shelf 326 includes the pressure extension 322 having an arm 358 extending from the pressure extension 322 toward a pressure sidewall 298. The arm 358 further defines the tip shelf 326. A rib 310 extends into a tip passage 330 interior of the airfoil. A tip channel 321 is defined between the pressure extension 322 and a suction extension 324 at a suction sidewall 300. The tip shelf 326 includes a side wall 342 and a bottom wall 340, defining the tip shelf 326 with the arm 358. A corner 344 is defined at the intersection between the bottom wall 340 and the side wall 342. The tip shelf 326 is in fluid communication with a film hole 332. The film hole 332 has an inlet 346, and outlet 348, and a passage 350, fluidly coupling the inlet 346 to the outlet 348. The film hole 332 can be shaped, having a first portion 334 and a second portion 336, the first portion 334 connected to the inlet 346 and the second portion 336 connected to the outlet 348.

Referring to FIG. 12A, an extension axis 352 can define an outer section 354 and an inner section 356 for the pressure extension 322. The extension axis 352 can divide the pressure extension 322 into halves, such that the outer section 354 and the inner section 356 have equal heights, measured in the radial direction. Alternatively, it is contemplated that the extension axis 352 can be defined at any position along the pressure extension 322, such that the outer and inner sections 354, 356 are defined. The outer section 354 can include the arm 358. An outlet 348 for the film hole 332 can be disposed within the outer section 354. Additionally, it is contemplated that the outlet 348 can be disposed on the arm 358, having the film hole 332 shaped to extend into the arm 358 to feed the outlet 348. Positioning the outlet 348 on the outer section 354 provides for increased length for the film hole 332 extending to the outer section 354. The increased length provides increased effectiveness for the film hole 332. Additionally, the film hole 332 can be arcuate, providing a further increase in film hole length as well as being shaped to provide directionality of a fluid from the film hole 332.

Referring to FIG. 12B, a bottom wall 340 is defined within the tip shelf 326, being coplanar with a tip wall 320. The outlet 348 for the film hole 332 can be disposed within the bottom wall 340. Placing the outlet on the bottom wall 340 can provide a flow of fluid from the film hole 332 along the bottom wall 340. Referring to FIG. 12C, the outlet 348 for the film hole 332 can be disposed in the corner 344. Placing the outlet 348 at the corner 344 can provide a flow of fluid along the corner 344. Providing a fluid such as a cooling fluid at the corner 344 can reduce temperatures are the corner 344, where such an increased thickness can include increased temperatures during engine operation. Reduction of these temperatures can increase lifetime of the airfoil.

It should be understood that the film hole 332, including the inlet 346, outlet 348, or passage 350, can be shaped to direct a flow of fluid passing through the film hole 332. Such shaping can include, but is not limited to, converging, diverging, or metering sections. The shaping can improve film cooling or reduce the required amount of fluid provided through the film holes 332. The converging section can increase the flow velocity of the flow of fluid, the diverging section can decrease the flow velocity of the flow of fluid, and the metering section can meter the flow of fluid passing through it. Additional shaping can include an expansion section or a reduction section. The expansion section can include an increasing cross-sectional area to form a diffusion section and the reduction section can include a decreasing cross-sectional area.

It should be appreciated that the film hole 332 can be shaped to extend through or provide the outlet on the arm 358. Such an organization could provide a cooling fluid flow along the underside of the arm 358 or into the corner between the arm 358 and the sidewall 342. It should be understood that non-linear shaping of the film hole 332 can achieve such a geometry. The extended length of the film hole 332 in such an example can provide for improved film cooling flow and directionality, which can improve surface film cooling while reducing the required flow provided through the film hole 332.

A method of flowing a cooling fluid through an engine component, such as the airfoil of FIG. 2, can include flowing a cooling fluid through a film hole 132, 232, 332 in a tip shelf 126, 226, 326 and can include exhausting the cooling fluid from the film hole 132, 232, 332 through an outlet 192, 248, 348 located radially outside of an apex 180 of the tip shelf 126, 226, 326. The apex 180 can be defined based upon the apex axis 182 of FIG. 10C, or the extension axes 252, 352 of FIGS. 11B and 12A, in non-limiting examples. The method can further include diffusing the cooling fluid at the outlet 192, 248, 348. Such diffusion can be accomplished with outlet shaping as described herein. Furthermore, the method can include metering the cooling fluid with the film hole 132, 232, 332. Similarly, metering the cooling fluid can be accomplished by shaping the film hole 132, 232, 332, such as by utilizing inlet shaping or outlet shaping.

FIGS. 10A-12C include the film holes 132, 232, 332 fluidly coupling the tip passages 130, 230, 330 to a tip shelf 126, 226, 326. The film holes include the first and second portions. The first and second portions should be understood as exemplary of shaping the film holes. Such exemplary shaping can include inlet shaping and outlet shaping. For example, the shaping such as diverging, converging, or metering portions can be the inlet and outlet shaping. Furthermore, the film holes need not be linear. The film holes can be shaped including or independent of the inlet and outlet shaping. The film holes can be arcuate, segmented, serpentine, or similar in non-limiting shaping examples. Such film hole shaping can be combined with the inlet and outlet shaping to improve fluid flow through the film hole 132. Such improved fluid flows can provide for improved film cooling, for example.

Additionally, film hole shaping, inlet shaping, or outlet shaping can influence a flow of fluid moving through the film hole or provided to the external surface of the airfoil. Such an influence can include increasing, decreasing, metering, or otherwise effecting the flow of fluid. For example, a diverging outlet including an expansion section, as illustrated in FIGS. 11-13C, can be used to spread a cooling film along a greater surface area of the airfoil, reducing the required cooling flows provided from the film holes. In another example, a metering portion can be included to meter the flow of cooling fluid fed to the film holes from the tip passage in order to reduce or minimize the amount of cooling fluid provided through the film holes. In yet another example, a converging section or a reduction section can accelerate the flow of fluid passing through the section to enhance the cooling.

Additionally, such film hole shaping, inlet shaping, or outlet shaping can be accomplished with additive manufacturing. Additive manufacturing, such as 3D printing, can be used to form complex film hole designs, having such shaping, which is otherwise difficult to achieve with other manufacturing methods, such as drilling or casting. It is further contemplated that the airfoil, the tip structures, or tip shelves can be made with additive manufacturing. Such manufacturing can provide a more accurately made product, having a higher yield as compared to other manufacturing strategies.

Further still, while the tip shelves are described as being defined in the pressure side of the airfoil, it should be appreciated that the tip shelves can have applicability to the suction side of the airfoil, or any other surface of the airfoil such as at the leading edge or the trailing edge.

It should be appreciated that shaping the film holes as described in FIGS. 10A-12C can provide for an increase in effectiveness of the film holes in providing a film of cooling fluid along the tip shelf. Such an increase in effectiveness can reduce the required cooling flow amount by up to 50%, while particular shaping may decrease the required cooling flow amount by even more.

It should be appreciated that as described herein, the filleted surfaces, being internal or external, increase the length for the film holes and the L/D values for film holes by locally increasing both the internal and external fillet radius through which the hole penetrates. The increased values for L/D provide for increased cooling film hole effectiveness. The fillets can minimally increase overall system weight without thickening an entire wall or surface. Furthermore, the fillets provide for an increase in structural support. Further still, the fillets accommodate film hole inlet or exit shaping, as well as non-linear geometries. As such, exit shaping should be understood as any shape other than a standard round inlet or exit. Additionally, as described herein, any fillets can be used in combination with one another, such that two fillets are used to increase the L/D ratio for film holes extending through the fillets.

The film holes can be in a wall surface or a fillet surface and penetrate through at least a portion of the fillet, permitting an increased length for the film hole otherwise impossible to achieve without the fillet. Furthermore, the fillets can be compounded, such as filleted internal surfaces or the combination in external and internal surfaces to further increase the length to achieve greater L/D values.

It should be further appreciated that the fillets provide for an increased length providing the potential for a wider range of film holes, such as curved film holes, "S-curved" film holes as well as other orientations beyond a standard straight or compound film hole with increased effectiveness.

It should be further understood that while the embodiments as described herein relate to an airfoil, the filleted corners can be utilized in additional engine components having intersecting walls to define a corner and utilizing film holes or cooling at or near those corners of the engine components.

It should be appreciated that application of the disclosed design is not limited to turbine engines with fan and booster sections, but is applicable to turbojets and turbo engines as well.

This written description uses examples to disclose the invention, including the best mode, and to enable any person skilled in the art to practice the invention, including making and using any devices or systems and performing any incorporated methods. The patentable scope of the invention is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An airfoil for a turbine engine comprising:
   an outer wall defining a pressure sidewall and a suction sidewall, extending chord-wise from a leading edge to a trailing edge and span-wise from a root to a tip;
   an extension extending from the outer wall at the tip;
   a tip shelf disposed in the pressure sidewall and at least partially defined by the extension, with the tip shelf including a bottom wall and a side wall of the extension defining a corner where the bottom wall and the side wall intersect; and
   at least one film hole extending into the tip shelf and having an inlet and an outlet connected by a passage fluidly coupling the inlet to the outlet, with the outlet having an expansion section;
   wherein the at least one film hole includes a plurality of film holes having a plurality of outlets and the plurality of outlets are disposed among the bottom wall, the side wall, and the corner with at least one outlet of the plurality of outlets provided on each of the bottom wall, the side wall, and the corner.

2. The airfoil of claim 1 wherein the at least one outlet on the side wall is disposed on a radially outer section of the side wall.

3. The airfoil of claim 1 wherein the extension is arcuate.

4. The airfoil of claim 3 wherein the at least one outlet on the side wall is disposed radially outward of an apex of the extension.

5. The airfoil of claim 1 wherein the airfoil further includes an interior having a fillet adjacent to the tip shelf.

6. The airfoil of claim 5 wherein the at least one film hole extends through the fillet, having the at least one inlet disposed on the fillet.

7. The airfoil of claim 1 wherein the at least one expansion section includes a diffusion section.

8. The airfoil of claim 7 wherein the at least one passage includes a metering section.

9. The airfoil of claim 1 wherein the at least one expansion section is further defined by an increasing cross-sectional area for the at least one outlet.

10. The airfoil of claim 1 wherein the at least one inlet and the at least one outlet provide up to a 50% reduction in cooling fluid flow compared to that of another film hole without the expansion section.

11. A blade for a turbine engine comprising:
    an outer wall defining an interior having a pressure side and a suction side, extending chord-wise from a leading edge to a trailing edge and span-wise from a root to a tip;
    an extension extending from the outer wall at the tip;
    a tip shelf disposed in the outer wall at the extension;
    a fillet positioned within the interior and adjacent to the tip shelf; and
    at least one film hole disposed in the tip shelf and extending through the fillet, and having an inlet disposed on the fillet and an outlet connected by a passage fluidly coupling the inlet to the outlet, with the outlet having an expansion section;
    wherein the extension is curved at the tip shelf in both the span-wise direction and the chord-wise direction.

12. The blade of claim 11 wherein the curved extension defines an apex along the extension.

13. The blade of claim 12 wherein the at least one outlet is disposed radially outward of the apex of the tip shelf.

14. The blade of claim 11 wherein the at least one expansion section includes a diffusion section.

15. The blade of claim 14 wherein the at least one passage includes a metering section.

16. The blade of claim 11 wherein the at least one inlet and the at least one outlet provide up to a 50% reduction in cooling fluid flow compared to another film hole without the expansion section.

17. An airfoil for a turbine engine comprising:
    an outer wall defining a pressure sidewall and a suction sidewall, extending chord-wise from a leading edge to a trailing edge and span-wise from a root to a tip including an extension;
    a tip shelf disposed in the pressure sidewall and at least partially defined by the extension; and
    a film hole extending into the tip shelf and having an inlet and an outlet connected by a passage fluidly coupling the inlet to the outlet, with the outlet having an expansion section;
    wherein the tip shelf is arcuate and the outlet is disposed radially outward of an apex of the tip shelf.

18. The airfoil of claim 17 wherein the airfoil further includes an interior having a fillet adjacent to the tip shelf.

19. The airfoil of claim 18 wherein the film hole extends through the fillet, having the inlet disposed on the fillet.

* * * * *